United States Patent [19]
Bessel et al.

[11] Patent Number: 6,069,663
[45] Date of Patent: May 30, 2000

[54] AUTO-CONFIGURING TELEVISION AND TELEVISION ENCODER FOR COMPUTER-STYLE DISPLAY INPUT

[75] Inventors: David H. Bessel, Poway; William McKnight, Rancho Sante Fe, both of Calif.

[73] Assignees: Sony Corporation, Tokyo, Japan; Sony Electronics, Inc., Park Ridge, N.J.

[21] Appl. No.: 08/946,020

[22] Filed: Oct. 6, 1997

[51] Int. Cl.[7] .................................................. H04N 7/01
[52] U.S. Cl. ............................................ 348/446; 348/441
[58] Field of Search .................................. 348/541–546, 348/441, 554, 555, 448, 452, 552, 446, 553, 806, 455; 345/327, 326, 328

[56] References Cited

U.S. PATENT DOCUMENTS

| | | | |
|---|---|---|---|
| 4,891,705 | 1/1990 | Suzuki et al. | 348/511 |
| 5,610,663 | 3/1997 | Nan et al. | 348/554 |
| 5,631,712 | 5/1997 | Suh et al. | 348/552 |
| 5,686,800 | 11/1997 | Kim | 348/806 |
| 5,713,040 | 1/1998 | Lee | 348/554 |
| 5,717,467 | 2/1998 | Shiki | 348/554 |
| 5,767,632 | 6/1998 | Yoshida et al. | 348/806 |
| 5,781,241 | 7/1998 | Donovan | 348/441 |
| 5,798,799 | 8/1998 | Jordan et al. | 348/552 |
| 5,801,767 | 9/1998 | Wu | 348/511 |
| 5,805,233 | 9/1998 | West | 348/537 |
| 5,850,263 | 12/1998 | Tauchi | 348/459 |
| 5,914,753 | 6/1999 | Donovan | 348/441 |
| 5,940,141 | 8/1999 | Faroudja et al. | 348/628 |
| 5,963,261 | 10/1999 | Dean | 348/446 |

OTHER PUBLICATIONS

International Search Report for Application PCT/US98/20964 (Oct. 6, 1998).

*Primary Examiner*—Andrew I. Faile
*Assistant Examiner*—Reuben M. Brown
*Attorney, Agent, or Firm*—Blakely, Sokoloff, Taylor & Zafman LLP

[57] ABSTRACT

A computer-generated image signal is analyzed to derive a set of alignment parameters for a television. These alignment parameters are then used to configure the television accordingly. The alignment parameters may include aspects of the computer-generated image signal such as a vertical period, a horizontal frequency, a horizontal front porch, a horizontal active image time and/or a maximum RGB video level. The television may be configured to reduce its raster length to accommodate the compute generated image signal. Further, the values of the horizontal measurements for the active video time, front porch and frequency of the computer-generated image signals may be used to determine values for the television's horizontal picture size and position. Such values may be determined by computation or by table look up. In addition, other television alignment parameters such as upper and lower pin cushion, vertical bow, pin amplitude and/or horizontal angle may be determined. The RGB parameters of the computer generated image signal may be used to derive optimal brightness and/or contrast settings for the television.

16 Claims, 3 Drawing Sheets

AUTO-CONFIGURING TELEVISION AND TELEVISION ENCODER FOR COMPUTER-STYLE DISPLAY INPUT

FIELD OF THE INVENTION

The present invention is related to the field of television receivers and, more particularly, to the display of computer generated images using such receivers.

BACKGROUND

Conventional television receivers are designed and configured to optimize the display quality of video program material. For example, in the United States, televisions are typically optimized to display NTSC and/or S-video signals from sources such as television antennas, video cassette recorders, digital satellite television receivers and/or cable television sources. Under some circumstances, however, it is desirable to display computer or computer-like generated images on a television receiver. For example, modern video conferencing systems often combine video signals (which may be formatted according to any of a variety of video signal transmission standards) with computer graphic signals (such as are used to display a variety of control buttons, etc.). Because the television is configured to optimize the display of conventional video signals, however, the resultant display of computer-generated images may be less than satisfactory.

To overcome some of these problems, some television receivers employ video encoders to convert computer-generated image signals into conventional NTSC signals before displaying the computer generated images. FIG. 1 illustrates such a system 10. As shown, a computer-generated image 12 may be provided to a television receiver 14 through a video encoder 16. Video encoder 16 may be part of television receiver 14 or it may be housed within the computer system that generated the image 12. Alternatively, video encoder 16 may be a stand-alone unit. Regardless of the configuration though, video encoder 16 generally operates by converting the (typically) VGA/RGB signals which make up computer-generated image 12 into conventional NTSC or S-video signals (in Europe or other areas, PAL signals may be provided for display by television receiver 14. The NTSC or S-video signals are typically provided to television receiver 14 through a compatible input port 18 on television receiver 14.

Although this arrangement may alleviate some of the problems associated with the display of computer-generated images on televisions, it does have some undesirable side effects. First, because televisions are generally setup to overscan the picture, i.e., televisions typically do not display the entire image broadcast by the video source, and computer images use the entire visible raster (e.g., on a computer video monitor), system 10 will not display the outer edges of the computer-generated image 12. This may be compensated for through manual control inputs 20 which may be used to adjust the picture size to accommodate the entire computer generated image 12. However, this will have the drawback of effectively shrinking the display area of television receiver 14. Further, additional control inputs 20 will be required when television receiver 14 is used to display conventional television video input signals (e.g., from a cable television source) to recover the original display size. Second, because tile picture quality of a conventional television receiver degrades rapidly at the edges of the display, computer-generated material at the edges of the of the display (which may often be text, e.g., for a menu) will be displayed poorly. Third, the user must manually switch the television to display the images received through port 18.

SUMMARY OF THE INVENTION

In one embodiment, the present invention provides a method of displaying a computer-generated image signal on a television. The computer-generated image signal is analyzed to derive a set of alignment parameters for the television. These alignment parameters are then used to configure the television accordingly. The alignment parameters may include aspects of the computer-generated image such as a vertical period, a horizontal frequency, a horizontal front porch, a horizontal active image time and/or a maximum RGB video level. The television may be configured to reduce its raster length to accommodate the computer-generated image signal. Further, the values of the horizontal measurements for the active video time, front porch and frequency of the computer-generated image may be used to determine values for the television's horizontal picture size and position. Such values may be determined by computation or by table look up. In addition, other television alignment parameters such as upper and lower pin cushion, vertical bow, pin amplitude and/or horizontal angle may be determined. The RGB parameters of the computer-generated image signal may be used to derive optimal brightness and/or contrast settings for the television.

In a further embodiment, a television includes means for analyzing a computer-generated image signal to derive an alignment parameter; and means for automatically configuring the television to display the computer-generated image signals in accordance therewith. The means for analyzing may include a format analyzer configured to receive the computer-generated image signal and to produce a television alignment command in response thereto. In addition, the television may include means for decoding the alignment command to derive the alignment parameter. The decoding means may be a look-up table which includes the alignment parameter. Further, the format analyzer may be configured to derive a set of horizontal parameters for the computer-generated image signal and to provide a corresponding set of horizontal display alignment commands for the television in response thereto.

BRIEF DESCRIPTION OF THE DRAWINGS

The present invention is illustrated by way of example and not limitation in the figures of the accompanying, drawings in which.

DETAILED DESCRIPTION

A method and an apparatus for automatically configuring a television receiver to display computer-generated images are disclosed. As used herein, the terms "configured", "configure" and the like are used to describe the arrangement (e.g., through automatic processes) of a television receiver's internal circuitry (e.g., display circuitry). In digital systems, such as digital televisions and the like, such configuration is generally accomplished through the programming of registers or similar programmable elements or devices, which programming is used to reflect a preferred/desired state or states of one or more parameters.

In one embodiment, a computer-generated image signal is analyzed to derive a set of alignment parameters for the television. These alignment parameters are then used to configure the television accordingly. The alignment parameters may include aspects of the computer-generated image such as a vertical period, a horizontal frequency, a horizontal front porch, a horizontal active image time and/or a maximum RGB video level. The television may be configure to reduce its raster length to accommodate the computer-generated image signal. Further, the values of the horizontal measurements for the active video time, front porch and frequency of the computer-generated image may be used to determine values for the television's horizontal picture size and position. Such values may be determined by computation or by table look up. In addition, other television alignment parameters such as upper and lower pin cushion, vertical bow, pin amplitude and/or horizontal angle may be determined. The RGB parameters of the computer-generated image signal may be used to derive optimal brightness and/or contrast settings for the television.

In a further embodiment, a television includes means for analyzing a computer-generated image signal to derive an alignment parameter; and means for automatically configuring the television to display the computer-generated image signals in accordance therewith. The means for analyzing may include a format analyzer configured to receive the computer-generated image signal and to produce a television alignment command in response thereto. In addition, the television may include means for decoding the alignment command to derive the alignment parameter. The decoding means may be a look-up table which includes the alignment parameter. Further, the format analyzer may be configured to derive a set of horizontal parameters for the computer-generated image signal and to provide a corresponding set of horizontal display alignment commands for the television in response thereto.

Figure 1:
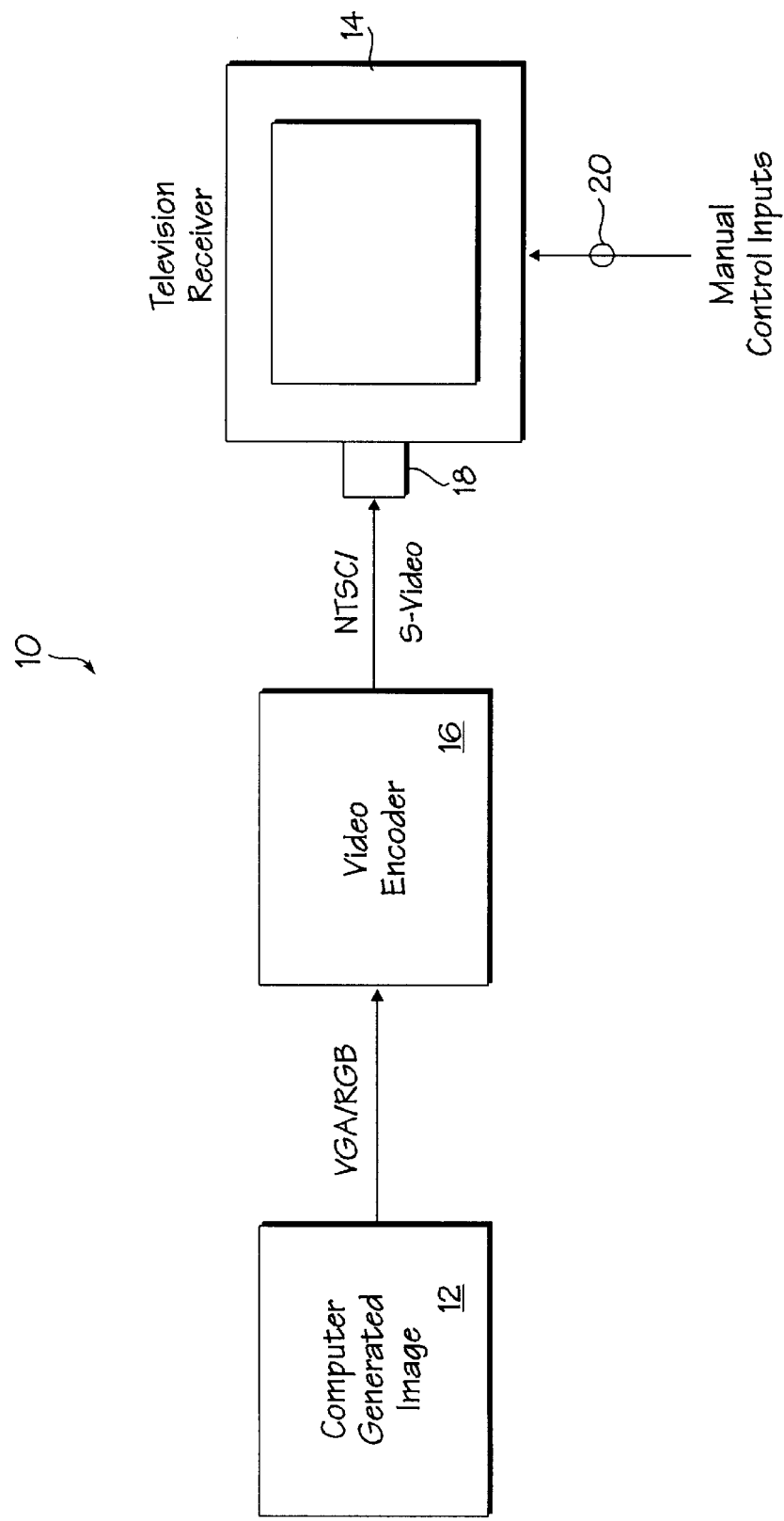
FIG. 1 illustrates a conventional system for displaying computer-generated images on a television.
Figure 2:
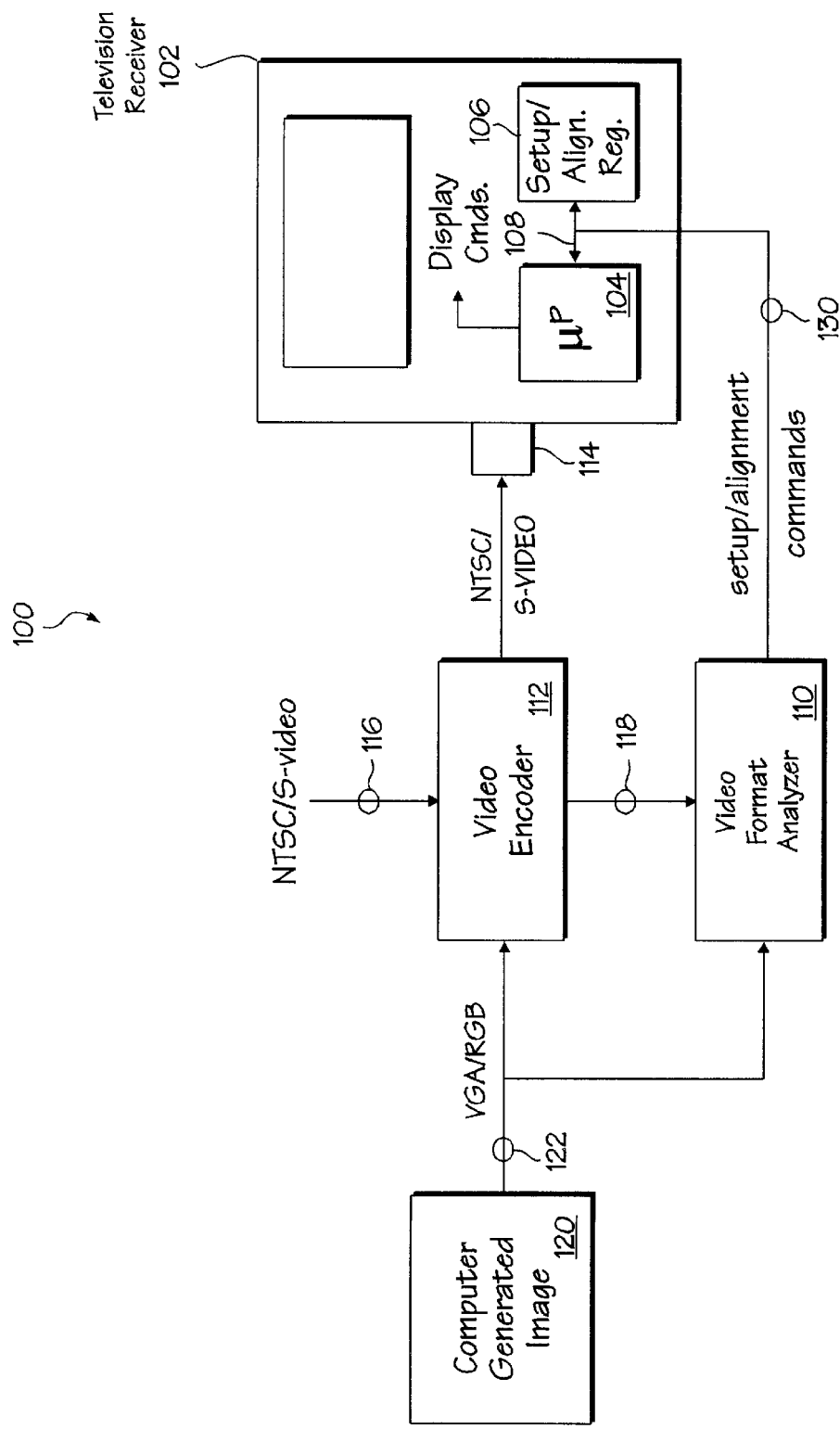
FIG. 2 illustrates a television system for displaying computer generated images according to one embodiment of the present invention.

FIG. 2 illustrates a digital system 100 configured according to one embodiment of the present invention. Digital system 100 includes a television receiver 102 which is adapted to display both conventional video signals (e.g., NTSC, S-video, PAL, etc.) and computer-generated image signals. Further, television receiver 102 is capable of automatically configuring its display characteristics according to a set of alignment and/or set-up parameters to optimize the display of received signals. To accomplish these tasks, television receiver 102 includes a microprocessor or other programmable controller 104 and a set-up/alignment register bank 106. Microprocessor 104 is coupled to register bank 106 through a bus 108 and is configured to read register bank 106 to obtain set-up/alignment parameters. These set-up/alignment parameters may then be used to produce display commands for other units within television receiver 102 so that the display characteristics of television receiver 102 al optimized according to the set-up/alignment parameters. Register bank 106 may comprise a read/write memory (or memories) so that the set-up/alignment parameters stored therein can be updated or overwritten as required. In other embodiments, register bank 106 may be a read only memory (or memories), in which case the set-up/alignment parameters are stored as a look-up table and microprocessor 104 may retrieve appropriate values from the look-up table according to various alignment commands. In still further embodiments, register bank 106 may comprise a look-up table that is overwriteable. In such embodiments, preferred set-up/alignment parameters may be stored in register bank 106 far typical video and computer-generated image signal applications and such values may be updated according to new video or other signal standards as required. This provides a degree of flexibility and backwards compatibility for television receiver 102 as changes to video signal standards are made. Still other configurations for register bank 106 are possible and each may provide the basic functionality of storing set-up/alignment parameters for use by microprocessor 104.

The use of microprocessor 104 allows television receiver 102 to control the generation of video images displayed thereon. These display characteristics (e.g., image horizontal and vertical size, etc.) may be changed according to numeric parameters (e.g., the set-up/alignment parameters from register bank 106) to optimize the display of such images. Further, by allowing microprocessor 104 to accept different set-up/alignment parameters, television receiver 102 may be configured to optimize the display of computer-generated images. Thus, television receiver 102 may have a "television" mode, wherein the set-up/alignment parameters used by microprocessor 104 are adapted to provide optimum viewing of conventional television video signals, and a "computer" mode, wherein the set-up/alignment parameters are adapted to provide optimum viewing of computer-generated image.

Television receiver 102 may switch between its television and computer modes (i.e., microprocessor 104 may load appropriate set-up/alignment parameters from register bank 106) in response to see-up/alignment commands 130 from video format analyzer 110. Video format analyzer 110 may be part of television receiver 102 or it may be a separate stand-alone unit. Alternatively, video format analyzer 110 may be combined with video encoder 112 as a "smart" video encoder. Such a "smart" video encoder may be a stand alone unit or may be incorporated within television receiver 102. In any of these configurations, video format analyzer 10 may be configured to provide set-up/alignment commands 130 to microprocessor 104 to allow microprocessor 104 to load set-up/alignment parameters from register bank 106 to optimize viewing for input signals at input port 114. Alternatively, VFA 110 may provide such parameters directly to microprocessor 104 as part of commands 130.

For conventional television video signals (e.g., NTSC or S-video signals) 116 for display on television receiver 102, video encoder 112 will pass a control signal 118 to video format analyzer (VFA) 110 advising VFA 110 that conventional video signals are being displayed. These conventional video signals 116 are passed unaltered from video encoder 112 to television receiver 102 through input port 114. At the same time, VFA 110 sends set-up/alignment commands 130 to microprocessor 104 advising microprocessor 104 that conventional video signals are being displayed. In response, microprocessor 104 accesses the prestored set-up/alignment parameters for conventional video signals from register bank 106 and configures the display units of television receiver 102 accordingly.

When a computer-generated image 120 is to be displayed on television receiver 102, video encoder 112 passes and appropriate control signal 118 to video format analyzer 110 and performs conventional video encoding (e.g., VGA/RGB to NTSC or S-video) to provide conventional video signals to television receiver 102 at input port 114. In response to control signal 118, VFA 110 receives the computer-generated image signals 122 and performs a set of parameter measurements on these signals. These measurements may include, but are not limited to, the vertical period of signals 122, the horizontal frequency of signals 122, the horizontal front porch of signals 122, the horizontal active image time of signals 122, and the maximum RGB video levels of signals 122. For other computer-generated image signal formats, other measurements may be performed. VFA 110 may be implemented (at least in part) as a programmable logic array (PAL) or other programmable device (e.g., a field programmable gate array (FPGA) or complex programmable logic device (CPLD)).

Using these measurements, and knowing the characteristics of television receiver 102, VFA 110 may calculate a set of set-up/alignment parameters for television receiver 102 to optimize the display of computer-generated image 120. For example, consider that to convert from an overscanned television image format to one compatible with the display of computer-generated images, it is necessary to reduce the raster length of the television receiver so that an entire active line of the computer-generated image will be visible on the television display. Accordingly, by knowing the raster length of television receiver 102 and measuring the active video time, horizontal front porch and horizontal frequency values for the computer-generated image signals 122, VFA 110 may derive appropriate values for the television receiver's horizontal picture size and position. In some cases, this may be done by direct computation or it may be accomplished through the use of (a) look-up table(s). In a like fashion, optimal values for other geometry parameters of television receiver 102, such as vertical image size and position, upper and lower pin cushion, vertical bow, pin amplitude vertical and horizontal angle, etc. can be determined. Similarly, the RGB parameters of signals 122 can be used to determined appropriate brightness and/or contrast settings for television receiver 122.

Having determined a set of set-up/alignment parameters for television receiver 102, VFA 110 may send these values directly to microprocessor 106 or may load these values into register bank 106 and then notify microprocessor 104 that the values should be read and used to adjust the alignment of television receiver 102. In still further embodiments, VFA 110 may compare its measured parameters for signals 122 against known computer-generated image formats and provide appropriate set-up/alignment commands 130 to microprocessor 104. Microprocessor 104 may use these commands to determine which of a set of prestored set-up/alignment parameters should be loaded from register bank 106 to optimize the display of computer-generated image 120. Further still, VFA 110 may continually or periodically monitor signal 122 and update the set-up/alignment commands 130 if any changes in the input signals 122 are observed. When regular television video signals 116 are again provided to television receiver 102, VFA 110 will be so informed by video encoder 112 and VFA 110 will instruct microprocessor 104 to revert to using set-up/alignment parameters appropriate for such input signals.

To determine the set-up/alignment commands 130 for television receiver 102, VFA 110 must accurately determine the vertical and horizontal parameters of computer-generated image signals 122. These parameters may be computed from video timing and other information contained within signals 122. For example, VFA 10 may duplicate the envelope (i.e., the non-image information included in computer-generated image signals 122) of these signals and then use this data to develop the set-up/alignment commands 130. To accomplish this task, VFA 10 receives signals 122 and measures (directly or indirectly) the vertical sync ($V_{sync}$), horizontal sync ($H_{sync}$) and active video time ($V_{active}$ and $H_{active}$) of these signals.

Figure 3:
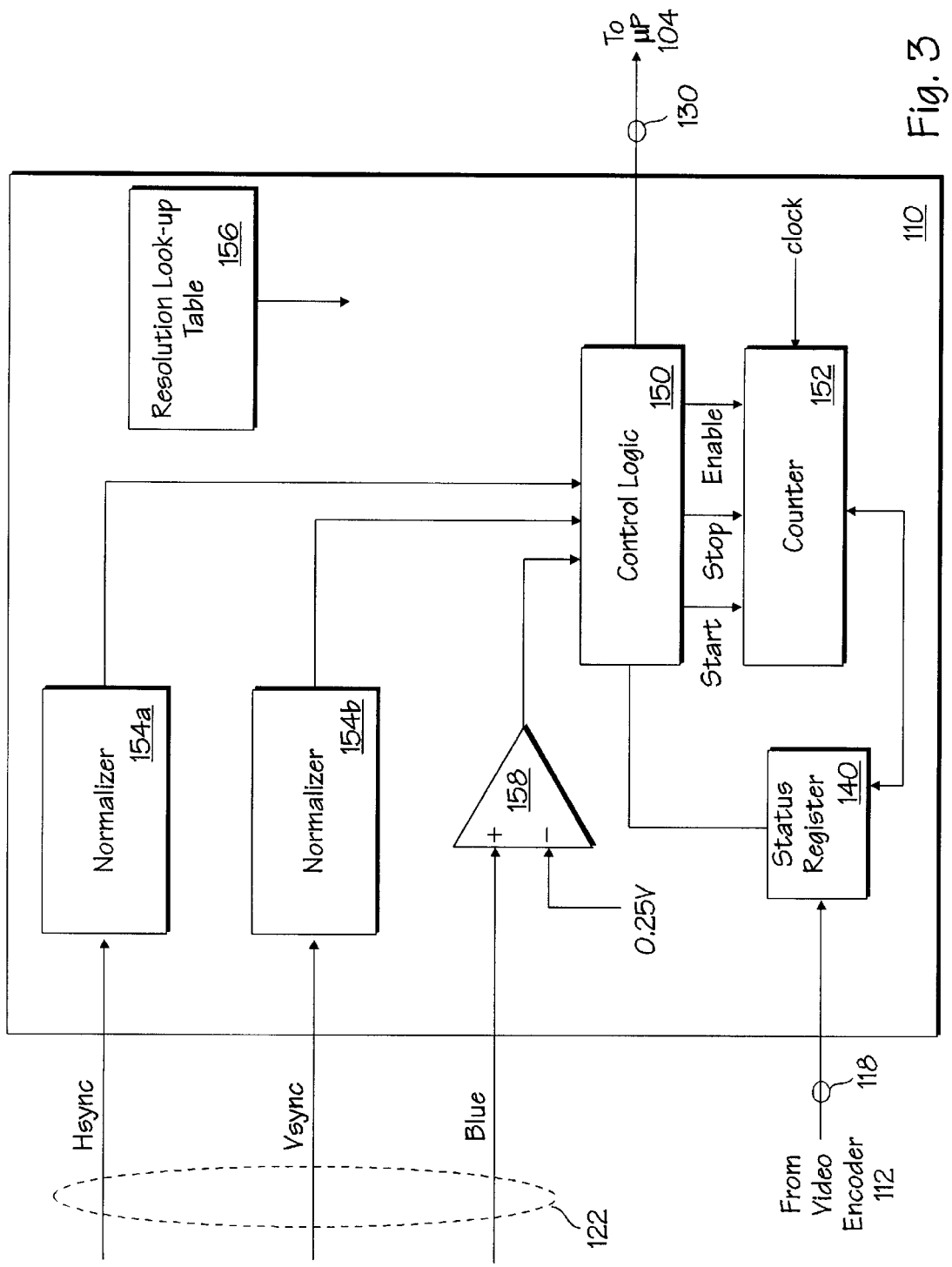
FIG. 3 illustrates a format analyzer configured according to one embodiment of the present invention.

Referring to FIG. 3, VFA 110 operates in response to command signals 118 provided by video encoder 112. Such command signals 118 may be written to a status register 140 which may be ready by control logic 150. In response, the control logic 150 may configure VFA 110 to provide appropriate set-up/alignment commands 130 to television receiver 102. When instructed to provide such set-up/alignment commands 130 for input signals 122 corresponding to computer-generated image 120, VFA 110 first measures the vertical resolution of signals 122. To complete such a measurement, VFA 110 first computes the total number of scan lines in a frame of the computer-generated image 120, using the $H_{sync}$ pulses of signals 122 as a time base. Basically, a counter 152 (operating under the control of control logic 150) of VFA 110 "counts" the number of scan lines per frame, i.e., the number of $H_{sync}$ pulses received while a $V_{sync}$ pulse is asserted.

The assertion of a $V_{sync}$ pulse is determined by a sync normalization function in a normalizer 154b which mates the determination based on the duty cycle of the received pulse. Sync normalization may be necessary because the polarity of the $H_{sync}$ and $V_{sync}$ pulses of the incoming computer-generated image signals 122 may vary depending upon the source of the image signals. Normalizers 154a and 154b will accept input $H_{sync}$ and $V_{sync}$ pulses, respectively, of either polarity and will output respective $H_{sync}$ and $V_{Sync}$ pulses of positive polarity. Normalizers 154a and 154b may be implemented in a variety of ways. For example, a counter which counts up when a sync signal is positive and down when a sync signal is negative; therefore, at the end of a counting period, the sign bit of the counter will correspond to the polarity of the sync pulse. This sign bit and the original sync pulse may then be provided as inputs to an exclusive OR (XOR) gate so that the output of the XOR gate will always be a positive polarity signal. Alternatively, the sync signals may be latched whenever image data is present and, as it is known that a sync signal is not present during active image data, the latched value will correspond to the polarity. Other methods of sync normalization may also be used.

Knowing the vertical resolution of the input computer-generated image signals 122, appropriate alignment commands 130 may be provided to microprocessor 104 to align the television receiver 102 to a corresponding display size.

VFA 110 also determines whether the computer-generated image signals 122 are interlaced or not. This is accomplished by first multiplying the $H_{sync}$ frequency of the signals 122 by the total number of horizontal pixels ($H_{total}$) which occur in a horizontal scan line. To determine $H_{total}$, a resolution look-up table 156 (which may be incorporated within VFA 110 or may be stored in a separate memory) may be consulted to determine a predicted horizontal resolution based on a measured vertical resolution for the signals 122. For example, if signals 122 correspond to a known computer industry standard resolution, e.g., the VESA standard, then a vertical resolution of approximately 1024 corresponds to a horizontal resolution of approximately 1280. Other corresponding resolutions are known in the computer arts. Thus, using the measured vertical resolution, a horizontal resolution for signals 122 may be obtained from look-up table 156 and, hence, an estimated number of pixels ($H_{total}$) which should occur during one scan line derived. This allows VFA 110 to send appropriate horizontal alignment commands 130 to television receiver 102.

To then determine whether or not the computer-generated image signals 122 are interlaced or non-interlaced VFA 110 may repeatedly measure the time between the start of $V_{sync}$ and $H_{sync}$ pulses of signals 122. It signals 122 are interlaced, two consecutive measurements by VFA 110 will yield values which differ by $H_{total}/2$. If the signals 122 are non-interlaced, two consecutive measurements will yield values which are identical. This determination may be used to generate appropriate set-up/alignment commands for television receiver 102.

Once the estimated $H_{total}$ value has been determined, VFA 110 may measure the active video periods of computer-generated image signals 122. The active video period is used to corroborate the predicted $H_{total}$ and horizontal resolution. The horizontal active time ($H_{active}$) is determine by counter 150 of VFA 110, which counts the number of locally generated clock pulses which occur between successive $H_{sync}$ pulses. Counter 152 further determines the vertical active time ($V_{active}$) by counting the number of $H_{sync}$ pulses which occur between successive $V_{sync}$ pulses. If the measured active video period ($H_{active}$, $V_{active}$) does not match the horizontal resolution predicted by the above-mentioned look-up table procedure, $H_{total}$ is adjusted accordingly. This can be an iterative process which is repeated until the predicted horizontal resolution agrees with the measured horizontal resolution.

After the correct value for $H_{total}$ is determined, VFA 110 may be used to determine the remaining horizontal and vertical parameters of computer-generated image signals 122, including $V_{front\ porch}$, $V_{back\ porch}$, $V_{total}$, $H_{front\ porch}$ and $H_{back\ porch}$. These parameters may be used to determine, among other things, the actual length and position of the active video region of the computer-generated image signal 122. As with the measurement of the vertical and horizontal resolutions, the vertical parameters are measured in units of horizontal scan lines, using $H_{sync}$ as a time base, while the horizontal parameters are measured using the clock signal as a time base.

In order to measure the active video region of signals 122, VFA 110 measures the vertical front and back porches ($V_{front\ porch}$, $V_{back\ porch}$, respectively) as well as the horizontal front and back porches ($H_{front\ porch}$, $H_{back\ porch}$, respectively) of the signals. A "front porch" is an area of at video waveform that sits between the start of a blanking pulse and the start of a sync pulse. A "back porch" is an area of a video signal that sits between the rising edge (or end) of a sync pulse and the start of active video. $V_{front\ porch}$ and $V_{back\ porch}$ are measured indirectly, by measuring the time from the leading edge of $V_{sync}$ to the start of video ($V_{start}$) and the time from the leading edge of $V_{sync}$ to the end of video ($V_{end}$). However, in order for VFA 110 to measure $V_{start}$ and $V_{end}$, computer-generated image signals 122 must contain known video on both the first and last scan line. This is accomplished by having a source of computer-generated image 120 (e.g., a video driver routine at a source compute or video conferencing system) generate a border including a number of pixels of a specified color (e.g. blue) at the boundary of the active image field of signals 122. The depth (i.e., the number of pixels) and color of the border may vary with different embodiments, however, a blue border of approximately 8 pixels is preferred. This border may be eliminated from the image ultimately displayed on television receiver 102 through the use of known techniques such as chroma-keying.

Once the blue border is established, a high speed comparator 158 signals when active video is present. In the embodiment illustrated in FIG. 3, the threshold detection for video signals is 0.25 volts, which is appropriate for most video systems which output video signals in the range of 0.0 to 0.7 volts. $V_{start}$ is then determined by counting the number of horizontal sync pulses that occur between the leading edge of $V_{sync}$ and the scan time during which video is first detected. $V_{end}$ is determined by counting the number of horizontal sync pulses which occur between the leading edge of $V_{sync}$ and the scan line during which video is last detected. If no video is detected, e.g., during a blanking interval, the measurement begins again. Once these vertical parameters of the computer-generated image signals 122 have been determined, appropriate set-up/alignments commands 130 may be transmitted to television receiver 102.

As with the $V_{front\ porch}$ and $V_{back\ porch}$, VFA 110 measures $H_{front\ porch}$ and $H_{back\ porch}$ indirectly, by measuring the time from the leading edge of $H_{sync}$ to the start of video $H_{start}$ and the time from the leading edge of $H_{sync}$ to the end of video ($H_{end}$). Again, appropriate borders are injected into the signals 122 to identify the active video region. Thus, comparator 158 may be used to determine when the active video signal is present and $H_{start}$ is determined by counting the number of clock pulses that occur between the leading edge of $H_{sync}$ and the scan line during which video is first detected. $H_{end}$ is determined by counting the number of clock pulses which occur between the leading edge of $H_{sync}$ and the scan line during which video is last detected. If no video is detected (e.g., during a blanking interval), the measurements begin again. With these values, appropriate set-up/alignment commands 130 may be transmitted to television receiver 102.

Using these and other alignment parameters provided by VFA 110, television receiver 102 may be configured to, among other things, reduce its raster length to accommodate the computer-generated image 120. Further, the values of the horizontal and vertical measurements for the active video time, front porch and frequency of the computer-generated image signals 122 may be used to determine values for the television's horizontal and vertical picture size and position. Such values may be determined by computation or by table look up. In addition, other television alignment parameters such as upper and lower pin cushion, vertical bow, pin amplitude and/or horizontal angle may be determined using conventional video signal processing techniques. The RGB parameters of the computer-generated image signals 122 may be used to derive optimal brightness and/or contrast settings for television 102 using similar conventional signal processing techniques.

The present invention provides several advantages over systems of the past. First, even though televisions are generally setup to overscan the picture, the present invention allows a computer-generated image to be displayed using the entire visible raster. The automatic configuration provided by VFA 110 eliminates the need for manual control inputs to adjust the television picture size to accommodate the entire computer-generated image and further eliminates the problem of shrinking the display area of television receiver 102 to accommodate such an image. Further, VFA 110 automatically reconfigures television receiver 102 for optimum display quality when television receiver 102 is again used to display conventional television video input signals. Second, VFA 110 can configure the display area of television receiver 110 to compensate for the tendency of the picture quality to degrade at the edges of the display. Thus, computer-generated material at the edges of the of the display will be displayed properly. Third, the present invention allows for the use of a single input port of television receiver 102 for conventional video signals as well as computer-generated image signals. Thus, there is no need for a user to manually switch the television to display computer-generated images received through a separate port.

Thus a method and apparatus for automatically configuring a television receiver to display computer-generated images have been described. Although features and examples of the present invention have been described with reference to specific exemplary embodiments thereof, those skilled in the art will appreciate that certain modifications may be possible without departing from the broader spirit and scope of the invention which should be limited only by the claims which follow.

What is claimed is:

1. A method of displaying a computer-generated image on a television, comprising the steps of:

measuring a vertical resolution alignment parameter of a computer-generated image signal for a television receiver;

obtaining a horizontal resolution alignment parameter of said computer-generated image signal from an alignment parameter look-up table using said vertical resolution alignment parameter of said computer-generated image signal for the television receiver;

analyzing the computer-generated image signal to derive a set of remaining alignment parameters for a television receiver; and configuring said television receiver to display said computer-generated image signal according to said vertical and horizontal resolution alignment parameters and said remaining alignment parameters.

2. The method of claim 1 wherein said step of analyzing comprises determining a vertical period, a horizontal period, a vertical frequency, a horizontal frequency, a vertical front porch, a horizontal front porch, a vertical back porch, a horizontal back porch, a vertical active image time, a horizontal active image time, or a maximum RGB video level of said computer-generated image signal.

3. The method of claim 2 wherein said step of configuring comprises reducing a raster length of said television receiver to accommodate said computer generated image signal.

4. The method of claim 2 wherein said step of analyzing further comprises determining alignment parameters for a horizontal picture size for said television receiver.

5. The method of claim 2 wherein said step of analyzing further comprises determining alignment parameters for a horizontal picture position for said television receiver.

6. The method of claim 2 wherein said step of analyzing further comprises determining alignment parameters for a vertical picture size for said television receiver.

7. The method of claim 2 wherein said step of analyzing further comprises determining alignment parameters for a vertical picture position for said television receiver.

8. The method of claim 2 wherein said step of analyzing further comprises determining alignment parameters for an upper or lower pin cushion for said television receiver.

9. The method of claim 2 wherein said step of analyzing further comprises determining alignment parameters for a vertical bow for said television receiver.

10. The method of claim 2 wherein said step of analyzing further comprises determining alignment parameters for a pin amplitude for said television receiver.

11. The method of claim 2 wherein said step of analyzing further comprises determining alignment parameters for a horizontal angle for said television receiver.

12. The method of claim 2 wherein said step of analyzing further comprises determining alignment parameters for a brightness or contrast setting for said television receiver.

13. A television comprising:

means for measuring a vertical resolution alignment parameter of a computer-generated image signal for it television receiver;

means for obtaining a horizontal resolution alignment parameter of said computer-generated image signal front a look-up table using said vertical resolution alignment parameter of said computer-generated image signal for the television receiver;

means for analyzing the computer-generated image signal to derive a set of remaining alignment parameters for the television; and means for automatically configuring said television receiver to display said computer-generated image signal according to said vertical and horizontal alignment parameters and said remaining alignment parameters.

14. The television of claim 13 wherein said means for analyzing comprise a video format analyzer configured to receive said computer-generated image signal and to produce one or more television alignment commands in response thereto.

15. The television of claim 14 further comprising means for decoding said one or more alignment commands to derive said remaining alignment parameters.

16. The television of claim 15 wherein said means for decoding includes said look-up table configured to store one or more said remaining alignment parameters.

* * * * *